US009061537B2

(12) United States Patent
Kim

(10) Patent No.: US 9,061,537 B2
(45) Date of Patent: Jun. 23, 2015

(54) BLANKET FOR PRINTING ROLLER AND METHOD FOR FABRICATING THE SAME

(75) Inventor: Byung-Geol Kim, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 735 days.

(21) Appl. No.: 12/832,800

(22) Filed: Jul. 8, 2010

(65) Prior Publication Data

US 2011/0005416 A1    Jan. 13, 2011

(30) Foreign Application Priority Data

Jul. 10, 2009   (KR) .................. 10-2009-0062963

(51) Int. Cl.
*B41N 10/04*   (2006.01)
*C08G 77/04*   (2006.01)
*C08G 77/12*   (2006.01)
*C08G 77/20*   (2006.01)

(52) U.S. Cl.
CPC ................ *B41N 10/04* (2013.01); *C08G 77/04* (2013.01); *C08G 77/12* (2013.01); *C08G 77/20* (2013.01); *B41N 2210/02* (2013.01); *B41N 2210/04* (2013.01); *B41N 2210/14* (2013.01); *B41N 2210/06* (2013.01)

(58) Field of Classification Search
None
See application file for complete search history.

(56) References Cited

U.S. PATENT DOCUMENTS

2008/0178756 A1* 7/2008 Nam et al. .................... 101/217

FOREIGN PATENT DOCUMENTS

| JP | 3444563 | | 9/2003 |
| JP | 2005-125664 A | | 5/2005 |
| KR | 10-2008-0056848 | | 6/2008 |
| KR | 10-2008-0071774 | | 8/2008 |
| KR | 2009059990 A | * | 6/2009 |

* cited by examiner

*Primary Examiner* — Joshua D Zimmerman
(74) *Attorney, Agent, or Firm* — McKenna Long & Aldridge LLP

(57) ABSTRACT

The present invention relates to a blanket for a printing roller which can enhance adhesive force to an printing liquid and a method for fabricating the same. The blanket for a printing roller includes a base film, a buffer portion formed on a backside of the base film, and a printing mold formed on an entire surface of the base film to have methylic resin such that the printing mold has adhesivity to a surface thereof.

4 Claims, 8 Drawing Sheets

BLANKET FOR PRINTING ROLLER AND METHOD FOR FABRICATING THE SAME

CROSS REFERENCE TO RELATED APPLICATION

This application claims the benefit of the Patent Korean Application No. 10-2009-0062963, filed on Jul. 10, 2009, which is hereby incorporated by reference as if fully set forth herein.

BACKGROUND OF THE DISCLOSURE

1. Field of the Disclosure

The present invention relates to a blanket for a printing roller which can enhance adhesive force to an printing liquid and a method for fabricating the same.

2. Discussion of the Related Art

Recently, various kinds of flat display devices have been developed, which can reduce weight and volume that are disadvantages of a cathode ray tube. As the flat display device, there are a liquid crystal display device, a field emission display device, a plasma display panel, an electroluminescence EL display device, and so on.

The flat display device is provided with a plurality of thin films formed by mask process including a deposition step, an exposure step, a development step, and etching step, and so on. However, since the mask process as a complicate fabrication process, the mask process increases a production cost. Consequently, researches for forming the thin film by using a printing process utilizing a printing roller are under progress.

The printing process is a process in which the printing liquid is coated on a blanket on the printing roller, a pattern of the printing liquid is formed on the printing roller by using a printing plate, and the pattern of the printing liquid is transcribed to a substrate, thereby forming a desired thin film.

In this instance, while a surface of the blanket has an oxygen composition so as to be hydrophilic, the printing liquid coated on the blanket is hydrophobic. In this case, a repelling force taken place between the hydrophilic blanket and the hydrophobic printing liquid makes wet-ability between the two poor, causing defective adhesion between the printing liquid and the blanket. The defective adhesion leads to form an organic pattern on the blanket having a line width smaller than a desired line width, causing a problem in that a de-wetting defect takes place, in which an organic pattern having a small line width is transcribed to a substrate.

SUMMARY OF THE DISCLOSURE

Accordingly, the present invention is directed to a blanket for a printing roller and a method for fabricating the same.

An object of the present invention is to provide blanket for a printing roller which can enhance adhesive force to an printing liquid and a method for fabricating the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a blanket for a printing roller includes a base film, a buffer portion formed on a backside of the base film, and a printing mold formed on an entire surface of the base film to have methylic resin such that the printing mold has adhesivity to a surface thereof.

The printing mold includes about 75~85% of main substance, about 5~15% of supplementary substance to be coupled to the main substance, about 0.5~1% of catalyst for enhancing reaction when the main substance couples to the supplementary substance, and about 5~10% of methylic resin.

The methylic resin is methylic resin of a siloxane group having the following chemical formula for increasing an amount of the methyl group on a surface of the printing mold.

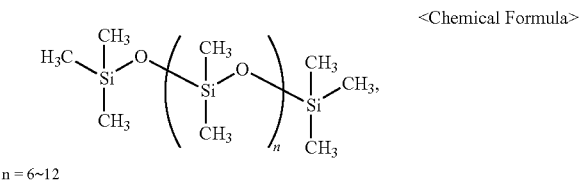

<Chemical Formula> n = 6~12

The methylic resin has a molecular weight of 1K-8K.

In another aspect of the present invention, a method for fabricating a blanket includes providing a base film, forming a printing mold on an entire surface of the base film to have methylic resin to have an adhesive characteristic on a surface thereof, and forming a buffer portion on a backside of the base film.

The forming a printing mold includes mixing about 75~85% of main substance, about 5~15% of supplementary substance to be coupled to the main substance, about 0.5~1% of catalyst for enhancing reaction when the main substance couples to the supplementary substance, and about 5~10% of methylic resin and coating a mixture thereof on the base film, and thermally curing the mixture coated on the base film.

The thermal curing is performed at 90~150° C. for about 5~10 minutes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF THE ILLUSTRATED EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
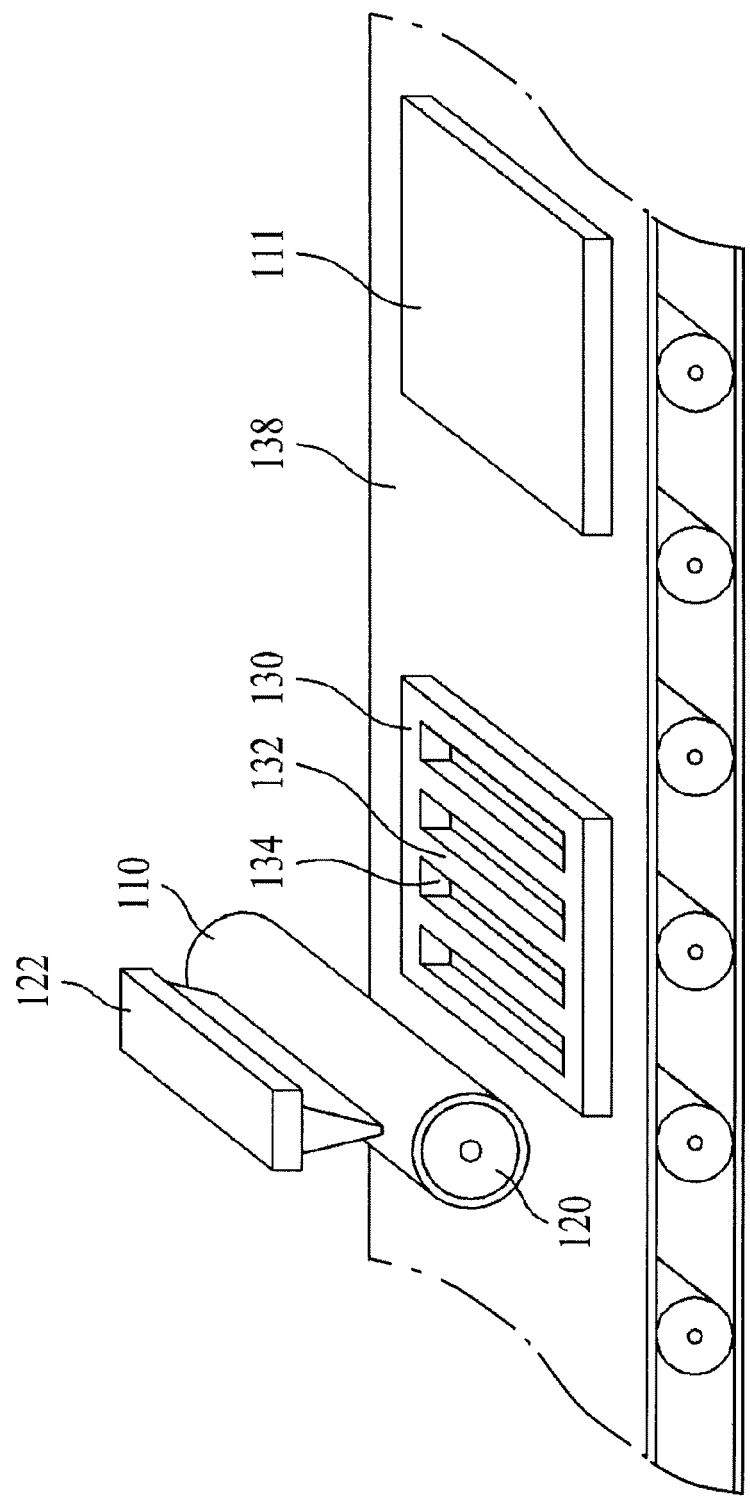
FIG. 1 illustrates a perspective view of a printing apparatus of the present invention.

FIG. 1 illustrates a section of a printing apparatus for forming a thin film pattern in accordance with a first preferred embodiment of the present invention.

Referring to FIG. 1, the printing apparatus has a reverse off-set roll printing applied thereto and includes an printing liquid supply unit 122, a printing roller 120, a blanket 110, and a printing plate 130.

The printing liquid supply unit 122 holds the printing liquid for supplying the printing liquid to the blanket 110 on the printing roller 120.

The printing plate 130 is brought into contact with the printing roller 120 such that the printing liquid filled in the blanket 110 of the printing roller 120 is left only at desired areas. To do this, the printing plate 130 includes a depressed pattern 134 and a relieved pattern 132. When the printing roller 120 rolls on the printing plate 130, the relieved pattern 132 is brought into contact with the printing liquid coated on the printing roller 120. According to this, when the printing roller 120 rolls on the printing plate 130, the printing liquid is transcribed from the printing roller 120 to the relieved pattern 132. However, even if the printing roller 120 rolls on the printing plate 130, the depressed pattern 134 is not brought into contact with the printing liquid on the printing roller 120. According to this, the printing liquid on the printing roller 120 matched to the depressed pattern 134 is remained on the printing roller 120 to form an organic pattern.

The printing roller 120 rolls on the printing plate 130 and the substrate 111 which move on a transfer unit 138 such that the printing roller 120 is brought into contact with the printing plate 130 and the substrate 111 in succession. Or, alternatively, the printing roller 120 may roll to move on the printing plate 130 and the substrate 111 in a stat the printing plate 130 and the substrate 111 are stationary such that the printing roller 120 is brought into contact with the printing plate 130 and the substrate 111 in succession.

Figure 2:
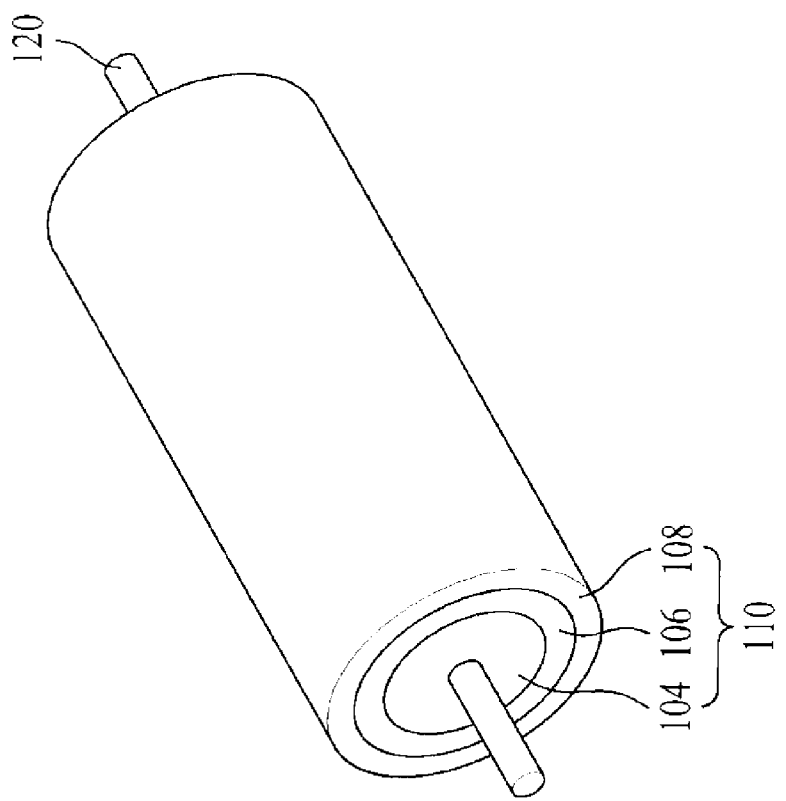
FIG. 2 illustrates a detailed perspective view of a blanket in FIG. 1.

The printing roller 120 fills the printing liquid from the printing liquid supply unit 122 to the blanket 110 attached to an outside circumference of the printing roller 120. As shown in FIG. 2, the blanket 110 includes a buffer portion 104, a base film 106, and a printing mold 108.

The buffer portion 104 is formed of foamed grains of PDMS (Polydimethylsiloxane) on a back side of the base film 106. The buffer portion 104 buffers impacts applied from the printing roller 120 to at least any one of the substrate 111 and the printing plate 130 when the printing liquid filled in the printing mold 108 is transcribed to the substrate 111 and the printing plate 130.

The base film 106 sustains tension applied to the blanket 110 for preventing the printing mold 108 from deforming in the printing. The base film 106 is formed of plastic resin, such as PET (Polythylene therephthalate) or PP (Polypropylene).

The printing mold 108 is formed to have printing grooves for filling the printing liquid to be transcribed to the substrate 111 and the printing plate 130 therein.

The printing mold 108 consists of about 75~85% of main substance, about 5~15% of supplementary substance, about 0.5~1% of catalyst, and about 5~10% of adhesive paste.

The main substance, a main material for forming the printing mold 108, is a Pre-polymer consisting of Vinyl Terminated Polydimethylsiloxane having and a terminal substituted with a vinyl group as shown in chemical formula 1.

[Chemical Formula 1]

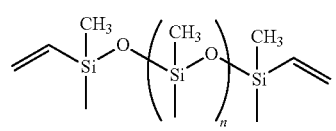

The supplementary substance is PDMS (Polydimethylsiloxane) which is a curing agent having a terminal thereof substituted with a hydrogen as shown in chemical formula 2. The hydrogen at the supplementary substance couples to the vinyl group at the main substance to form the printing mold 108.

[Chemical Formula 2]

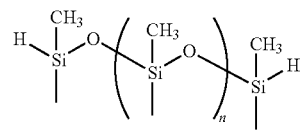

The catalyst is platinum Pt for enhancing reaction when the main substance and the supplementary substance couple.

The adhesive paste, an additive for enhancing adhesivity, is methylic resin in a siloxane group as shown in chemical formula 3. The methylic resin has a molecular weight in a range of 1K~8K.

[Chemical Formula 3]

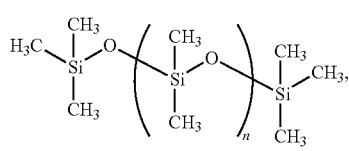

n = 6~12

Since a surface of the printing mold 108 is formed of the methyl group $CH_3$ owing to an increased amount of the methyl group of from the adhesive paste, the surface of the printing mold 108 becomes to have a polarity the same with the printing liquid supplied to the printing mold 108, i.e., the hydrophobicity. An attractive force is generated between the hydrophobic printing mold 108 and the organic liquid, to improve wet-ability, the adhesive force between the hydrophobic printing mold 108 and the hydrophobic printing liquid supplied to the surface of the printing mold 108 is improved. For an example, the hydrophobic printing liquid may be PGMEA (Propylene glycol monomethyl ether acetate).

In the meantime, surface energy of about 32.85 of the printing mold 108 of the present invention having the adhesive paste is higher than surface energy of the related art printing mold 108 as shown in table 1.

TABLE 1

|  | Related art | The present invention |
|---|---|---|
| Surface energy | 31.92 | 32.85 |

The surface energy is energy for forming a boundary surface with air. As the higher the surface energy, the stronger a property to form the boundary surface with an opposite substance, the adhesive force to the opposite substance becomes the stronger. And, as the lower the surface energy, the stronger a property to form the boundary surface with air than the opposite substance, making a property to form the boundary surface with the opposite substance difficult, separation from the opposite substance becomes the easier and a property to be in contact with air becomes the stronger.

Thus, since the surface energy of the blanket 110 of the present invention is higher than the surface energy of the related art blanket, with a property to form the boundary surface with the printing liquid being stronger, the blanket 110 has high adhesive force to the organic liquid.

Figure 3:
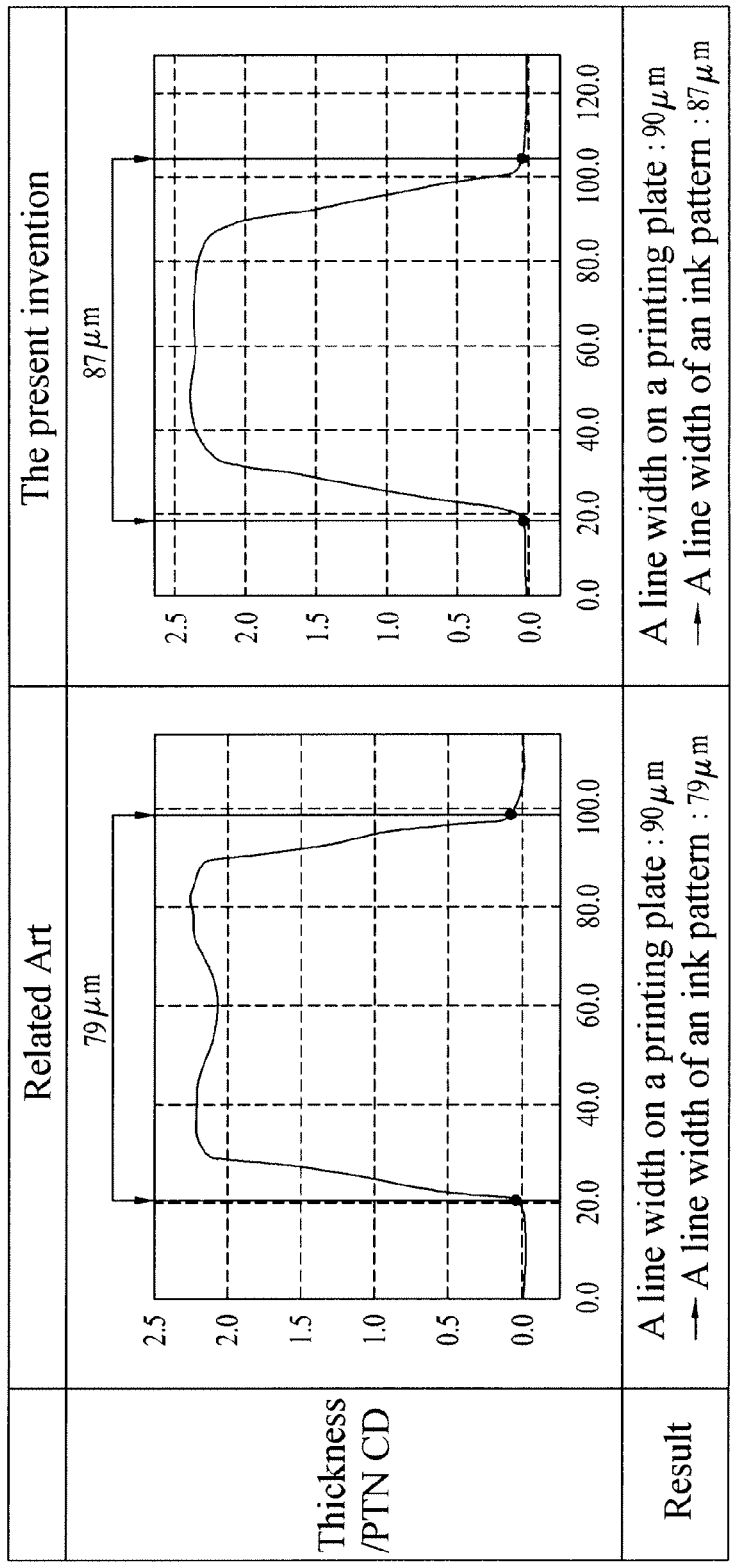
FIG. 3 illustrates a diagram for comparing a line width of an organic pattern of the present invention to the same in the related art.

Eventually, the organic pattern formed by the printing roller 120 having the blanket 110 of the present invention and the printing plate 130 enables to form a desired line width better than the related art organic pattern. That is, as shown in FIG. 3, as a result of comparison of the line widths of the organic patterns and the line widths of the printing plates of the related art and the present invention respectively, while the line width of the organic pattern in the related art formed on the substrate by the printing plate and the printing roller being 79 μm has an about difference from the line width on the printing plate, the line width of the organic pattern of the present invention being 87 μm has an about 3 μm difference from the line width on the printing plate. Thus, since the difference of the line width of the organic pattern of the present invention from the line width on the printing plate 130 is smaller than the same in the related art, it can be known that the present invention improves the de-wetting defect in comparison to the related art.

Figure 4A:
FIGS. 4A to 4C illustrate sections showing the steps of a method for fabricating the blanket in FIG. 2.
Figure 4B:
Figure 4C:
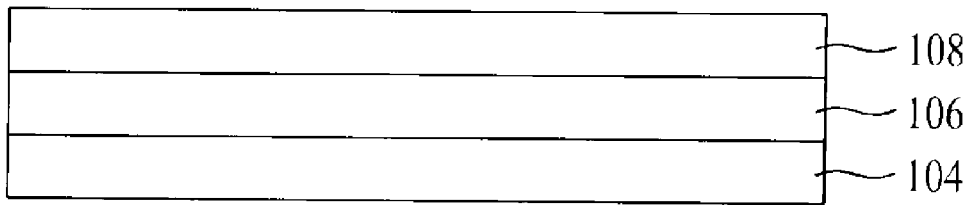

FIGS. 4A to 4C illustrate sections showing the steps of a method for fabricating the blanket in FIG. 2.

Referring to FIG. 4A, a base film 106 is provided. Then, main substance, supplementary substance, catalyst and adhesive paste, which are materials of the printing mold 108, are mixed. In this instance, the main substance, the supplementary substance, the catalyst and the adhesive paste are liquids. The mixed materials are coated on an entire surface of the base film 106 and subjected to high temperature thermal curing at about 90~150° C. for about 5~10 minutes, to form a printing mold 108. Then, a buffer portion 104 is attached to a backside of the base film 106 as shown in FIG. 4C.

Figure 5A:
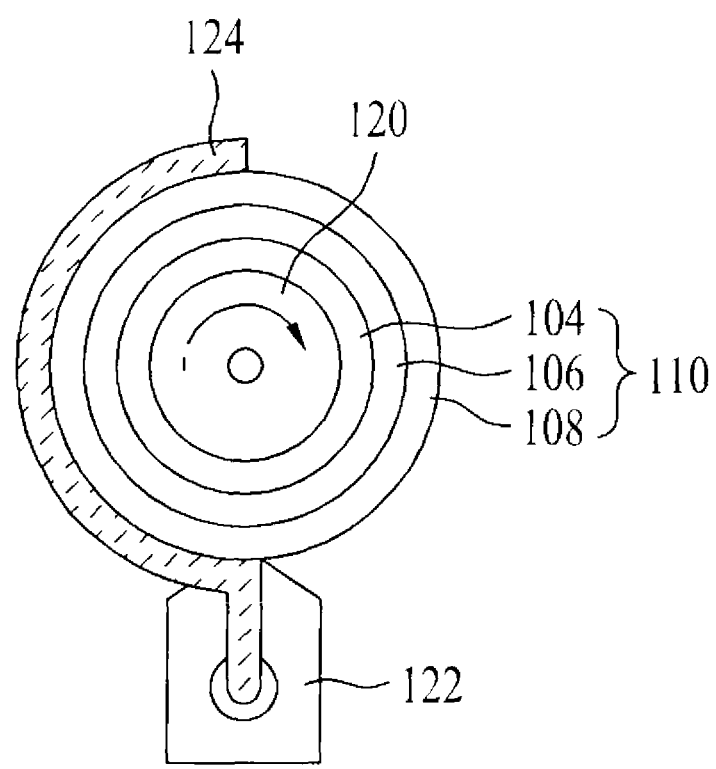
FIGS. 5A to 5C illustrate sections showing the steps of a method for forming a thin film pattern of a printing apparatus of the present invention.
Figure 5B:
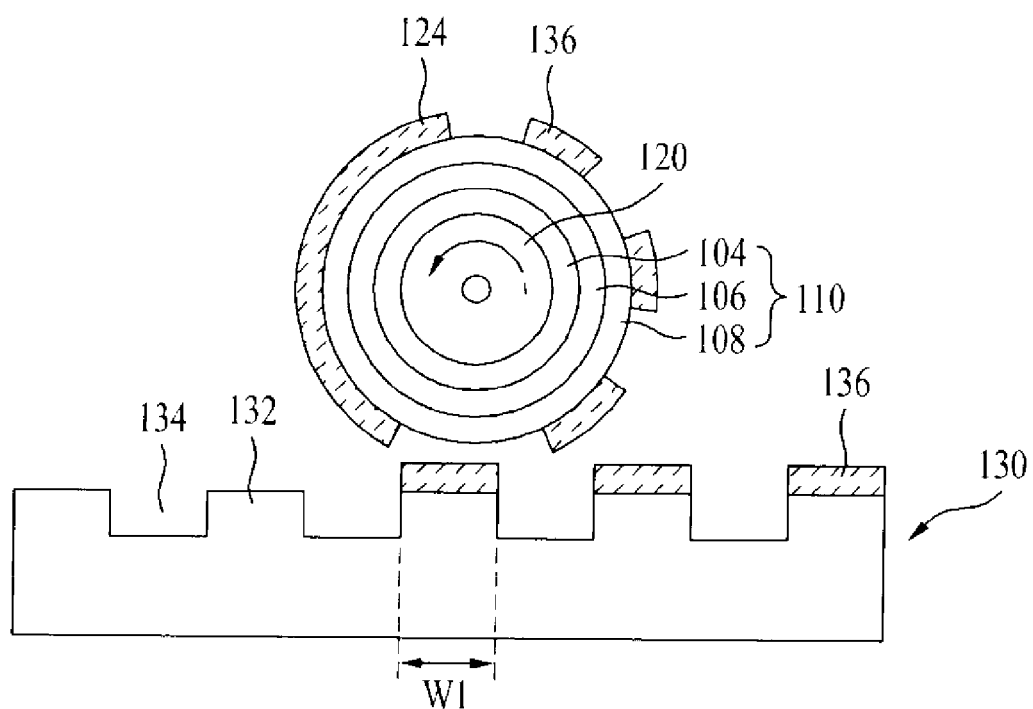
Figure 5C:
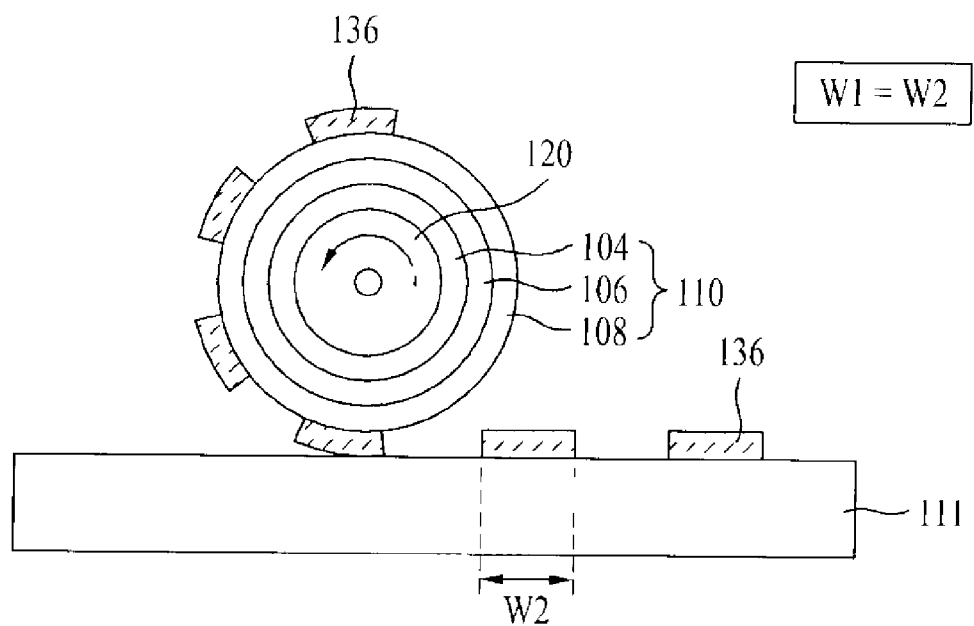

FIGS. 5A to 5C illustrate sections showing the steps of a method for forming a thin film pattern of a printing apparatus of the present invention.

Referring to FIG. 5A, a printing roller 120 having a blanket 110 attached thereto is provided. The blanket 110 includes a printing mold 108 consists of main substance, supplementary substance, catalyst, and methylic resin of the siloxane group formed by an adhesion paste added with adhesivity. The printing mold is filled with an printing liquid 124 through an printing liquid supply unit 122.

Then, referring to FIG. 5B, the printing roller 120 having the printing liquid 124 coated thereon is rolled on the printing plate 130 having a depressed pattern 134 and a relieved pattern 132. The relieved pattern 132 has a predetermined line width W1. The printing liquid 124 in an area which is brought into contact with the relieved pattern 132 has the printing liquid transcribed to the relieved pattern 132, and the printing liquid 124 in an area which is not brought into contact with the depressed pattern 134 is remained on a surface of the blanket 110 to form the organic pattern 136.

Referring to FIG. 5C, the printing roller 120 having the organic pattern 136 formed thereon rolls on the substrate 111. According to this, the organic pattern 136 is transcribed, dried and cured on the substrate 111, to form the thin film. In this instance, the line width W2 of the organic pattern 136 is similar or equal to the line width W1 of the relieved pattern 132 on the printing plate 130.

In the meantime, the printing apparatus of the present invention can form thin films or thick films, not only on the liquid crystal panel, but also on a flat display device, such as a plasma display panel, an electroluminescence EL display panel, a field emission display device, and the like.

Figure 6:
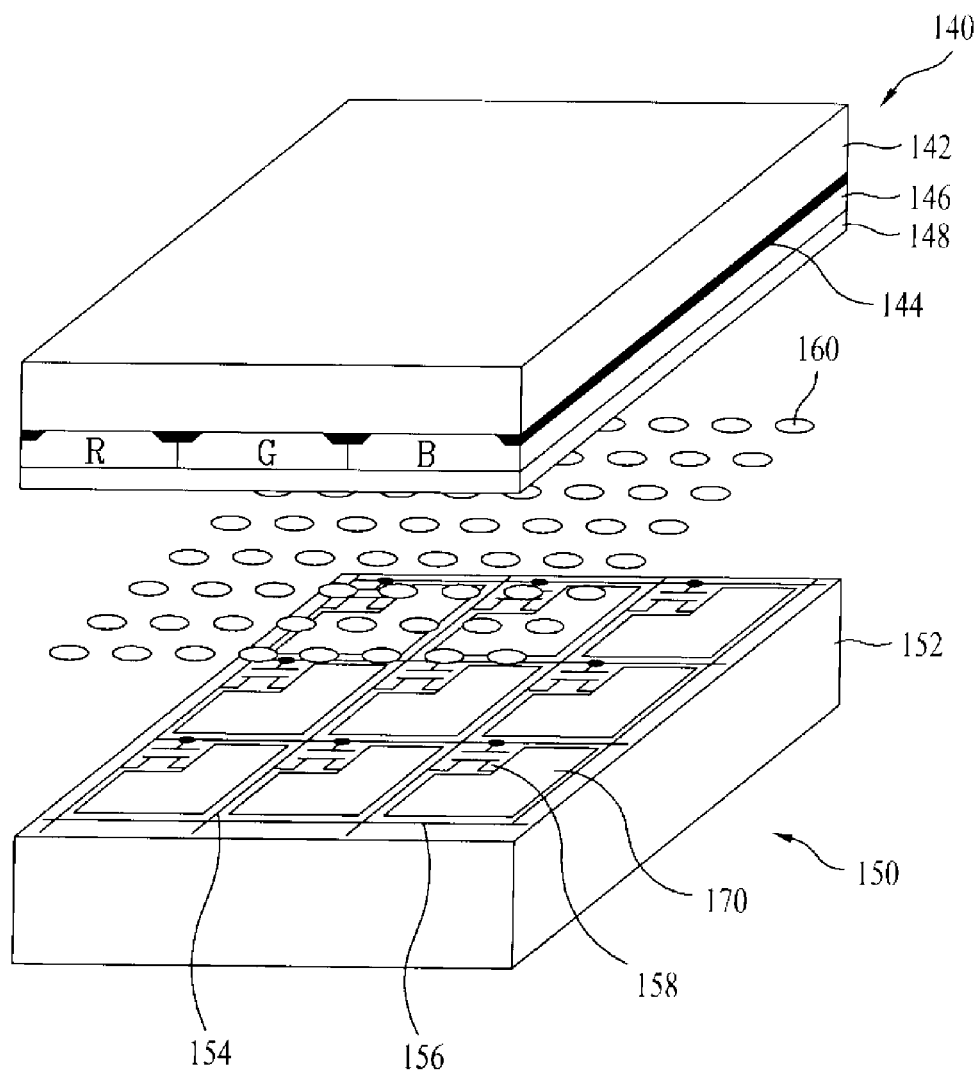
FIG. 6 illustrates a perspective view of a liquid crystal panel having a thin film pattern formed by the forming method of FIGS. 5A to 5C.

In detail, referring to FIG. 6, the liquid crystal panel of the present invention includes a thin film transistor substrate 150 and a color filter substrate 140 bonded opposite to each other with a liquid crystal layer 160 disposed therebetween.

The color filter substrate 140 includes a black matrix 144, a color filter 146, a common electrode 148, column spacers (not shown) formed on an upper substrate 142 in succession.

The thin film transistor substrate 150 includes gate lines 156 and data lines 154 formed to cross each other, thin film transistor 158 formed adjacent to every crossing portion thereof, and a pixel electrode 170 formed at every pixel region formed by the crossed structure.

The blanket roller of the present invention can form the color filter 146 and the black matrix of the liquid crystal panel, and thin films of organic substance, such as an organic thin film including the electroluminescence of an organic electroluminescence display device.

As has been described, the blanket for a printing roller and the method for fabricating the same of the present invention have the following advantages.

The printing mold of a blanket for the printing roller of the present invention has an adhesive having a methyl group. Since a surface of the printing mold formed of the methyl group $CH_3$ has a polarity the same with the printing liquid being supplied to the surface of the printing mold, adhesive force between the printing liquid and the printing mold is improved, thereby permitting to form a pattern of a desired line width on the substrate.

Moreover, the formation of the thin film pattern made available owing to the blanket for the printing roller of the present invention permits to save a cost since no photolithography process is required.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A blanket for a printing roller comprising:
   a base film;
   a buffer portion on a backside of the base film; and
   a printing mold on an entire surface of the base film including methylic resin such that the printing mold has adhesivity to a surface thereof and printing grooves for filling by a printing liquid,
   wherein a surface of the printing mold has a polarity the same as printing liquid supplied to the printing mold, wherein the printing mold consists of:
75~85% of main substance, wherein the main substance is a pre-polymer consisting of polydimethylsiloxane having a terminal substituted with a vinyl group,
5~15% of supplementary substance to be coupled with the main substance, wherein the supplementary substance is PDMS (Polydimethylsiloxane) which is a curing agent having a terminal thereof substituted with a hydrogen,
0.5~1% of catalyst for enhancing reaction when the main substance couples to the supplementary substance; and
more than 5% and 10% or less of the methylic resin,
wherein the methylic resin is methylic resin of a siloxane group having the chemical formula

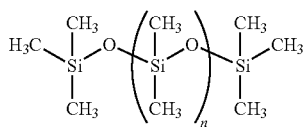

where n is a number that makes the methylic resin have a molecular weight of 1K to 8K, for increasing an amount of the methyl group on a surface of the printing mold, and
wherein the methyl group of the chemical formula is introduced into side chains and both ends of the siloxane group.

2. A method for fabricating a printing roller blanket comprising:
providing a base film; forming a printing mold on an entire surface of the base film having methylic resin such that the printing mold has adhesivity to a surface thereof and having printing grooves for filling a printing liquid, wherein a surface of the printing mold has a polarity the same as printing liquid supplied to the printing mold; and
forming a buffer portion on a backside of the base film,
wherein the printing mold consists of:
75-85% of main substance, wherein the main substance is a pre-polymer consisting of polydimethylsiloxane having a terminal substituted with a vinyl group,
5-15% of supplementary substance coupled with the main substance, wherein the supplementary substance is PDMS (polydimethylsiloxane) which is a curing agent having a terminal thereof substituted with a hydrogen,
0.5-1% of catalyst for enhancing reaction when the main substance couples with the supplementary substance; and
more than 5% and 10% or less of the methylic resin,
wherein the methylic resin is methylic resin of a siloxane group having the chemical formula

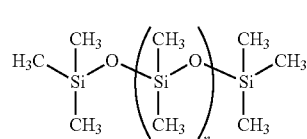

where n is a number that makes the methylic resin have a molecular weight of 1K to 8K, for increasing an amount of the methyl group on a surface of the printing mold, and
wherein the methyl group of the chemical formula is introduced into side chains and both ends of the siloxane group.

3. The method as claimed in claim 2, wherein forming a printing mold includes;
mixing the main substance, the supplementary substance, the catalyst, and the methylic resin and coating a mixture thereof on the base film, and
thermally curing the mixture coated on the base film.

4. The method as claimed in claim 3, wherein the thermal curing is performed at 90~150° C. for 5~10 minutes.

* * * * *